United States Patent [19]

Rehfeldt

[11] Patent Number: 4,538,187

[45] Date of Patent: Aug. 27, 1985

[54] METHOD OF AND CIRCUIT ARRANGEMENT FOR RECORDING A COLOR VIDEO SIGNAL

[75] Inventor: Karl H. Rehfeldt, Quickborn, Fed. Rep. of Germany

[73] Assignee: U.S. Philips Corporation, New York, N.Y.

[21] Appl. No.: 416,752

[22] Filed: Sep. 10, 1982

[30] Foreign Application Priority Data

Sep. 14, 1981 [DE] Fed. Rep. of Germany ....... 3136347

[51] Int. Cl.$^3$ .......................................... H04N 9/493
[52] U.S. Cl. .................................. 358/330; 358/334; 358/14
[58] Field of Search ............................... 358/330, 334

[56] References Cited

U.S. PATENT DOCUMENTS 4,208,671 6/1980 Ozawa .................................. 358/330
4,242,699 12/1980 Kobayashi ........................... 358/330
4,359,756 11/1982 Schneider ............................ 358/330

*Primary Examiner*—Michael A. Masinick
*Attorney, Agent, or Firm*—Robert T. Mayer

[57] ABSTRACT

The invention relates to a method of and a circuit arrangement for recording color signals on a video recorder, the polarity of the color-difference signals being inverted in order to reduce noise in the darker colors such as red and blue caused by the tape-head characteristic.

5 Claims, 3 Drawing Figures ofMETHOD OF AND CIRCUIT ARRANGEMENT FOR RECORDING A COLOR VIDEO SIGNAL

The invention relates to a circuit arrangement for recording a colour video signal, which signal comprises a luminance signal and two alternately transmitted colour-difference signals, on a record carrier, in particular a magnetic tape, by frequency modulation, recording being effected in the range of the falling portion of the frequency-amplitude transmission curve.

Suitably such signals are recorded in accordance with a time-division multiplex method in such a way that during a time interval which at least substantially corresponds to the horizontal scan the luminance signal is recorded, whilst in the flyback interval a colour-difference signal is recorded in time-compressed form. The length of the recording intervals and the compression may be selected in such a way that for the luminance signal and for the colour-difference signals the same frequency range is covered. During playback it is necessary to provide a corresponding time-expansion of the colour-difference signals and a storage for one line period, so that after this the three signals required for a colour picture are available simultaneously on each line.

Figure 1:
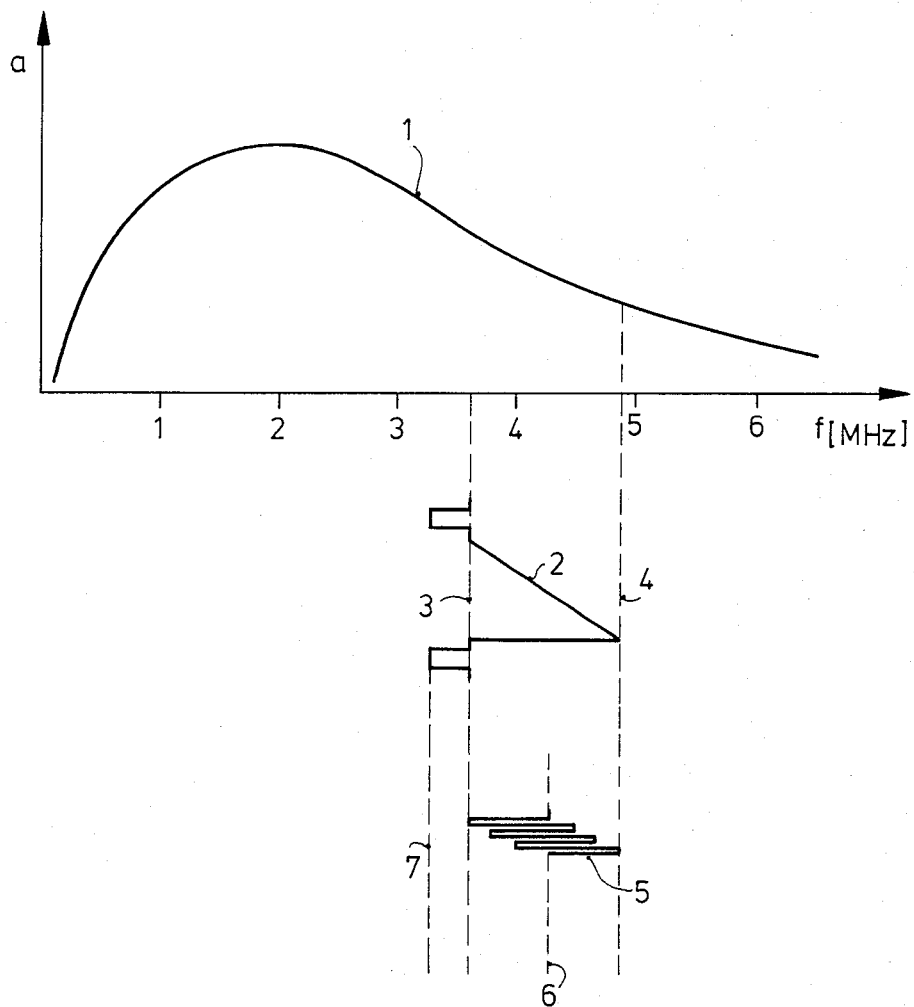

In particular when such signals are recorded in a frequency-modulated form on a magnetic tape by means of a magnetic head, this results in a transmission curve, which is typically as shown in FIG. 1: very low modulation frequencies below 1 MHz are recorded with a low amplitude. In the range from 1 to 1.5 MHz a maximum amplitude is reached and at higher frequencies a more or less uniform roll-off is obtained. In order to enable finer picture details to be recorded it should also be possible to record sideband frequencies of, for example, 3 MHz. On the other hand, the d.c. components of the half-tones between black and white should be recorded in a satisfactory manner. Therefore, as is shown in FIG. 1, the deviation of the frequency modulation for the video signal may be selected between 3.75 and 4.8 MHz. The lower sideband is then recorded correctly, whereas the other sideband is partly suppressed as a result of the transmission curve 1. A half-tone video signal corresponding to the curve 2 is then situated between a black level at 3.75 MHz, corresponding to the dashed line 3, and a peak-white level at 4.8 MHz, corresponding to the dashed line 4, the amplitude value a of the transmission curve 1 for the pulse peak being approximately twice as high as that for the peak-white level.

In a normal colour-difference signal (R-Y) or (B-Y), with the customary correlation and derivation from a matrix circuit and after level correction and clamping at an achromatic level, for example an average picture half-tone, the amplitude relationship as indicated by curve 5 is such that the colour difference signals for darker colours, such as purple, red and blue, are situated approximately at the locations where for the luminance signal 2 the average to brighter half-tones up to white are recorded and transmitted.

The invention is based on the recognition that in the case of colour-difference signals thus recorded a stronger noise occurs in said colours which are perceived as darker by the eye, because in the case of said method of recording these colour signals are read with a reduced amplitude. This also leads to a reduced signal-to-noise ratio. Therefore, the recording method should be improved in such a way that this undesired noise is reduced.

According to the invention this problem is solved in that the colour-difference signals are recorded with negative polarity in such a way that the amplitude values of bright colours such as yellow, cyan and green are recorded and at a higher frequency and, consequently, at lower values of the frequency-amplitude transmission curve, and darker colours such as purple, red and blue are recorded at higher values of the frequency-amplitude transmission curve.

Investigations, which have led to the present invention, have demonstrated that when this recording method with inverted polarity is used the signal values corresponding to the darker colours are reproduced with a higher amplitude and, consequently, with less noise. The signal values corresponding to brighter colours are then reproduced with a lower amplitude and with a higher noise level. However, it has been found that this higher noise percentage in the reproduction of the brighter colours is less annoying than in the darker colours.

For a recording in accordance with the invention the amplitude values of the darker-colour signals are situated at the location where in the curve 2 in FIG. 1 the brighter half-tones extend from the centre of the modulating range (between the lines 3 and 4) to the right up to the line 4, which range corresponds to a smaller amplitude value a of the curve 1. The values for the darker colours, however, are recorded in the range between the centre and the line 3, which corresponds to the higher amplitude values a of the curve 1.

Figure 2:
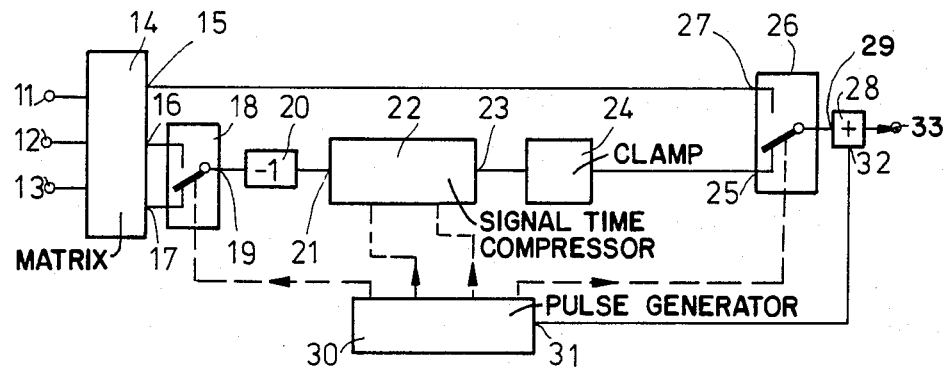
Figure 3:
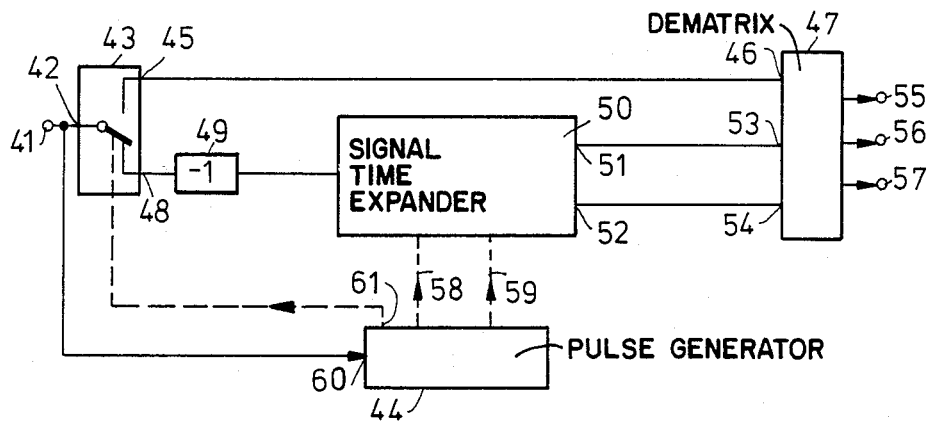

The invention will now be described in more detail, by way of example, with reference to the drawing, in which:

FIG. 1 shows the transmission curve 1 already mentioned, with the corresponding position of the signals, FIG. 2 shows a processing circuit in accordance with the invention for recording the luminance signal and the colour-difference signals on a magnetic tape, and FIG. 3 shows a processing circuit in accordance with the invention, by means of which circuit the recorded signals can be recovered.

From the terminals 11, 12 and 13 in FIG. 2 the colour signals R, G and B for red, green and blue are applied to the three inputs of the matrix circuit 14, in which the signals are combined in such a way that on the first output 15 the luminance signal Y, on the second output 16 the red colour-difference signal (R-Y) and on the third output 17 the blue colour-difference signal (B-Y) is available. The colour-difference signals are applied to the inputs of a switch 18 which is actuated with half the line frequency, so that they appear on its output 19 every alternate line.

According to the invention the signs of these colour-difference signals are reversed in the stage 20 in such a way that on the output of this stage the colour-difference signals −(R-Y) and −(B-Y) appear alternately.

The colour-difference signals applied to the stage 18 may also be derived from a received colour video signal by demodulation, the colour signals R, G and B being processed at the transmitter side in a circuit corresponding to the matrix 14. If the matrix 14 is present in a video recording apparatus the outputs 16 and 17 may be preceded by polarity-inverting stages, so that the stage 20 is then indispensable.

The resulting colour-difference signals whose signs have been inverted are applied to the input 21 of a compression stage 22, in which they are stored for one line period, in known manner, after which they become available again in time-compressed form on the output 23 during the blanking interval. The colour-difference signals thus obtained generally have an amplitude which exceeds the range between the lines 3 and 4 in FIG. 1; therefore they are amplitude-corrected in a correction and clamping stage 24 to be in conformity with the modulating range of the picture half-tones of the luminance signal 2 between the lines 3 and 4, and their average value is preferably shifted to an achromatic level as indicated by the dashed line 6 in FIG. 1, which is situated midway between the lines 3 and 4. The signal thus formed is then applied to an input 25 of an interval switch 26, on whose other input 27 the luminance signal appears. The inputs 25 and 27 are connected to the contacts of a change-over switch whose output is connected to the first input 29 of an adder stage 28, whose output supplies the composite signal, suitable for recording by means of a video recorder, to an output terminal 33.

A pulse generation stage 30 supplies the control signals for actuating the switches 18 and 26 and the storage and compression stage 22. Moreover, on an output 31 it supplies a shortened and, as the case may be, shifted synchronising pulse, which is applied to an input 32 of the adder stage 28. The switch 26 is controlled in conformity with a time-division multiplex method in such a way that the luminance signal is transmitted during the normal line scanning period and the time compressed colour-difference signals are transmitted alternately to the adder stage 28, in conformity with the operation of the switch 26, during the blanking interval.

As is shown in FIG. 3, a signal which is produced by the recording apparatus, for example a magnetic video tape recorder, is applied to the terminal 41 and then to the input of a switch 43, which corresponds to the switch 26 and which is actuated by a pulse stage 44 in conformity with the line scanning period and the blanking interval. The luminance signal is applied from the output 45 of the switch 43 to the input 46 of a dematrixing circuit 47. The colour-difference signal is applied from the output 48 of the switch 43 to a circuit 50 via a polarity-inverter stage 49 in accordance with the invention, in which circuit 50 storage and expansion are effected in such a way that the colour-difference signals (R-Y) and (B-Y) supplied from the terminal 41 every alternate line now appear continuously and simultaneously on the outputs 51 and 52 and are thus applied to the inputs 53 and 54 respectively of the dematrixing circuit 47. The colour signals R, G and B are then continuously and simultaneously available on the output terminals 55, 56 and 57 of the circuit 47.

The pulse circuit 44 supplies pulses for controlling time-dependent processes to the circuit 50 via the lines 58, 59 and, as the case may be, further lines. For this purpose the circuit 44 is synchronised by signals which are applied to its input 60 from the terminal 41. A further output 61 supplies the control signal for actuating the switch 43.

In the circuit shown in FIG. 3 the polarity inverter stage 49 may be arranged at a different location in the transmission path for the colour-difference signals, for example before the output 48 or before the outputs 51 and 52, or behind the inputs 53 and 54 in the matrix circuit 47.

A further improvement of the noise level can be obtained when the modulation range of the colour-difference signals 5 is extended further than the black level, which corresponds to the line 3, up to the synchronisation level 7. Alternatively, the level for the brighter colours situated on the line 4 in FIG. 1 may be shifted to the left substantially over the distance between the line 3 and the line 7 which corresponds to the synchronisation level. Then colour-difference signals may occur in the synchronisation-pulse range during the blanking interval. However, if in the usual manner these colour-difference signals are preceded by a synchronisation pulse and synchronisation is effected on the leading edges of the synchronisation pulses, an exact synchronisation remains possible.

What is claimed is:

1. A method for recording the information contained in a colour video signal, which signal comprises a luminance signal and two alternately transmitted colour-difference signals, on a record carrier, in particular a magnetic tape, by frequency modulation, recording being effected in the range of the falling portion of the frequency-amplitude transmission curve, including recording the colour-difference signals (R-Y) and (B-Y) with negative polarity in such a way that the amplitude values of bright colour such as a yellow, cyan and green are recorded at a higher frequency value and, consequently, at lower values of the frequency-amplitude transmission curve, and darker colours such as purple, red and blue are recorded at higher values of the frequency-amplitude transmission curve.

2. A method as claimed in claim 1, characterized in that before recording the polarity of the colour-difference signals are inverted and, as the case may be, the average value is additionally shifted towards the higher recording frequencies.

3. A method for reproducing a color signal from the information recorded by the method claimed in claim 1 or 2, including applying the colour-difference signals originating from the record carrier to a dematrixing circuit via a polarity-inverter stage.

4. A circuit arrangement for use in recording the information contained in a color video signal comprising matrix means for receiving said color video signal and producing in response thereto a luminance signal and two color difference signals, time compression and inverting means receiving said two color difference signals and processing them to produce two inverted time compressed color difference signals and adding means producing a composite signal by combining said luminance signal and said two compressed signals, said composite signal being suitable for recording.

5. A circuit arrangement for producing a color video signal from the composite signal produced by the arrangement of claim 4, including separating means receiving said composite signal and separating said luminance signal and said two compressed inverted color difference signals from each other, time expanding and inverting means processing said two inverted time compressed color difference signals and producing therefrom said two color difference signals and the matrixing means combining said luminance signal and said two color difference signals to produce said color video signal.

* * * * *